United States Patent [19]

Rosich et al.

[11] Patent Number: 5,574,855
[45] Date of Patent: Nov. 12, 1996

[54] METHOD AND APPARATUS FOR TESTING RAID SYSTEMS

[75] Inventors: Mitchell N. Rosich, Groton; William F. Beckett, Framingham; John W. Bradley, Peabody; Robert DeCrescenzo, North Attleboro, all of Mass.

[73] Assignee: EMC Corporation, Hopkinton, Mass.

[21] Appl. No.: 440,952

[22] Filed: May 15, 1995

[51] Int. Cl.$^6$ .................................................. G06F 11/00
[52] U.S. Cl. ................................. 395/183.17; 395/183.18
[58] Field of Search ........................ 395/183.17, 183.18, 395/183.08, 183.2, 441

[56] References Cited

U.S. PATENT DOCUMENTS

| | | | |
|---|---|---|---|
| 4,656,631 | 4/1987 | Nowak | 395/183.17 |
| 4,933,939 | 6/1990 | Kendall et al. | 371/5.5 |
| 5,278,838 | 1/1994 | Ng et al. | 395/182.04 |
| 5,285,384 | 2/1994 | Gineria | 364/408 |
| 5,335,169 | 8/1994 | Chong | 364/408 |
| 5,455,934 | 10/1995 | Holland et al. | 395/182.04 |

OTHER PUBLICATIONS

Kanawati et al., "Dependability Evaluation Using Hybrid Fault/Error Injection", IEEE pp. 224–228 1995.

*Primary Examiner*—Robert W. Beausoliel, Jr.
*Assistant Examiner*—Joseph E. Palys
*Attorney, Agent, or Firm*—Maureen Stretch

[57] ABSTRACT

An error injection test scripting system that permits a test engineer to select from a series of commands those that will induce a desired test scenario. These commands are presented to a parser, either in command line form or as a batch of commands, which parses the syntax of the commands and associated parameters, to create a task list which is communicated to a scheduler. The scheduler handles the execution of the tasks in the list, converts parameters to explicit logical block test sequences and maintains test results. Tasks such as error injection use a special protocol (which the unit under test must be able to understand and interpret) to circumvent standard bus and controller protocols, so that test data, such as corrupt parity or multiple hard error failures can be sent to the disks in the RAID system, while bypassing the RAID array management functions that would otherwise automatically correct or prevent the errors. The scenario of injected errors to be tested is then executed through a tester, the results are evaluated and posted back to the scheduler.

16 Claims, 9 Drawing Sheets

R      Read.
RC     Read with Compare.
W      Write.
RW     Read (once), then Write n times.*
WR     Write (once), then Read n times.*
RA     Read All block (in curr. Plane).
RAC    Read All blocks (in curr. Plane) & Compare.
WA     Write All block (in curr. Plane).
XRD    Extended Read and Compare.**
XWR    Extended Write.**
NOOP   No Operation

*   Write or Read n times, where n is the value coded in the iteration subfield.
**  Extended Read or Write commands are executed over n blocks ON the SAME DEVICE, where n is the value coded in the iteration subfield.

ERROR INJECTION SPECIFICATION FIELD

H    =    Simulates a hard error by spinning down the specific drive referenced.

CE    = Corrupt ECC in referenced block with a correctable error.

CD    = Corrupt DATA in referenced block with a correctable error.

NCE  =    Corrupt ECC in referenced block with a non-correctable error.

NCD  = Corrupt DATA in referenced block with a non-correctable error.

LRCL = Corrupt 1st byte of calculated LRC word in the referenced block.

LRCD = Corrupt 1st DATA byte in the referenced block, then rewrite the block without rewriting the LRC for the block.

FXH  = Fixes a simulated hard error by SPINNING UP the specific drive implied by the block reference.

BP    = Logical reference for the Parity Block.

BD    =    Logical reference for the Data Block (BD) defined via the Stripe Selector Address field (See paragraph above).

BC0  =    Logical reference of the first companion block to BD (the 1st successive block after BD).

BC1  = Logical reference of the second companion block to BD (the 2nd successive block after BD).

BC2  = Logical reference of the third companion block to BD (the 3rd successive block after BD). "

BC3  =    Logical reference of the fourth companion block to BD (the 4th successive block after BD).

BC4  = Logical reference of the fifth companion block to BD (the 5th successive block after BD).

BC5  = Logical reference of the sixth companion block to BD (the 6th successive block after BD).

Fig. 8

CONTROL SPECIFICATION Field

LOOP =   Specifies number of times the associated command line will be executed. The value coded with the LOOP keyword defines the number of reiterations.

ERR   = The ERR keyword is concatenated with any one of the three action options HALT, EXIT, or CONT to define the disposition of the error event.

HALT = Any value that is appended to this keyword defines the limit count for errors after which the program will halt. If no count value is supplied, the default is HALT on 1st error.

EXIT = Any value that is appended to this keyword defines the limit count for errors after which the program will exit. If no count value is supplied, the default is EXIT on 1st error.

CONT = Any value that is appended to this keyword defines the limit count for _ errors AFTER WHICH the program will unconditionally exit. If no value follows this keyword, the default is an unconditional and unlimited continue on error

Fig. 9

METHOD AND APPARATUS FOR TESTING RAID SYSTEMS

BACKGROUND OF THE INVENTION

This invention relates generally to test systems for disk storage system peripherals, and more particularly for testing systems for storage systems that use RAID technology.

Users who purchase RAID (Redundant Array of Independent Disks) storage systems, usually do so because they have large amounts of important data to store in a quickly accessible, affordable, reliable online form. RAID systems were developed for this purpose. In most RAID systems, several disks are used together in an array, and treated as logical disks by array management software or circuitry. Reliability and performance are handled by array management software in a disk controller or on the host computer.

Testing the array management software and the RAID system's ability to detect and handle various types of disk and media failures is made much more complicated by the complexity of the various types of RAID levels.

Different types of RAID systems, (RAID levels 0, 1, 2, 3, 4, and 5) offer users different levels and combinations of data security and access speed or performance. RAID 0, for example, uses a striping system to stripe data across several physical disks, with one part or "chunk" of the data on each disk. Level 1 mirrors the data, instead of striping it, by storing at least one extra copy of it on another disk in the array, to provide very high data reliability. RAID levels 2 and 3 provide high data transfer capabilities for files that are large, and read in large, continuous streams. They both assume parallel access of the files. RAID level 2 uses a Hamming code to detect and correct disk errors. In Raid level 3, parity data is stored on one disk. If that disk fails, the data is still intact, but the security provided by parity checking is lost. If a data disk fails, the data can be regenerated using the parity disk and the other disks in the system.

RAID level 4 is similar to level 3, in that it has data mapped across disks, in chunks, with one disk reserved for parity data, but level 4 operates its disks independently, while, in level 3, disks are operated in parallel. RAID level 5 is similar to 4, but instead of placing parity data on one disk, parity chunks are striped across the member disks. RAID-5 is, in some ways, the most complex type of RAID system.

A RAID-5 system is expected to be highly available, to handle any single block error or any single disk failure, and get good performance for numerous reads and writes of short to medium length data. If two failures occur, however, the system may not be able to recover the data, but a RAID level 5 implementation is still supposed to detect that error occurred and let the user know.

In RAID level 5, parity is the exclusive or ($\oplus$) function applied to the data chunks. Here, the term stripe is used to define the relationship of a parity chunk, and a collection of adjunct data chunks (each of which may be located on different drives), that are associated with each other as the content of their data is used in the calculation of parity data and the possible reconstruction of any associated chunk experiencing a media error or device failure. If data is striped in 4 data chunks across several drives, the parity chunk for that stripe is computed as:

$$P(0-3) = \text{Chunk } 0 \oplus \text{Chunk } 1 \oplus \text{Chunk } 2 \oplus \text{Chunk } 3$$

Any one chunk of the data can be regenerated from the contents of the corresponding chunks in that stripe on the remaining disks in the array. Thus, the operation $$x = P(0-3) \oplus \text{Chunk } 0 \oplus \text{Chunk } 1 \oplus \text{Chunk } 2$$

removes the effects of Chunks 0, 1, and 2 from the parity comparison and leaves x=Chunk 3. This is how RAID 5 systems are able to recover from a single disk or media failure. If one disk is down, or a block is defective, data on that disk can be reconstructed by the RAID 5 algorithm, by exclusive or'ing the remaining chunks of that stripe. If two failures occur together in a stripe, say disk one is completely down, and several blocks on disk 3 of a 5 disk system are bad, a RAID-5 system will not be able to reconstruct the requested blocks, but it should be able to detect this situation and report it to the user.

In order to test the array management function to insure that it correctly reconstructs data or detects unrecoverable double failures, a variety of correctable and non-correctable errors of various types and combinations need to be presented to the array management software.

Before the advent of RAID systems, one could present hard disk errors to systems and system software by manually powering a given disk drive down, or by inserting a disk that had known defects at known tracks. If the disk drive controller firmware or system software detected these situations and handled them properly, the test was a success. However, the very sophistication which makes RAID array management able to recover from or detect many more types of errors, makes it much harder to test the software or firmware itself.

For example, a RAID-5 system is supposed to recover from all single failures and at least detect and report any double failures. Many double failure scenarios can also be corrected. If a tester tries to create a double failure by placing two damaged disks into the array, it is difficult to organize a stripe so that the failures will occur together within the same stripe. Similarly, if a tester attempted to introduce a failure by powering down one drive, at the time it is estimated another drive with a known defective block will be read for that stripe, this is not likely to be an effective test, since the operator works in seconds, while the drives and systems are operating in milliseconds.

Using defective disks with known bad blocks doesn't provide much of a test even for the single failure algorithms. In addition, the test may not be consistently repeatable, given the difficulty of insuring that the array management software will always place the chunks of a stripe in such a way that they will consistently fall in the area known to be damaged.

Manufacturing testers have automated tests of error-handling for single disk non-RAID systems, by simulating or emulating error conditions that are likely to occur. RAID algorithms, however, are far more complicated than those for single disk systems, and attempts to automate this part of testing have met with frustration. A further challenge is presented when the RAID 5 systems uses cache to improve performance. For example, a data block that was corrupted on the disk, may be overwritten by pending data in the cache, so that when a read command is executed it retrieves the overwritten, good data not the once corrupted block. In RAID-5 systems, a cache may also cause problems for tests of write commands, since another aspect of a RAID-5 system is that a write actually causes a chunk and its corresponding parity chunk to be read first, so that the old data and parity can be exclusive or'd with the new data for parity and then the physical writes to the disk occur. If the test system cannot control or guarantee the cache contents it is difficult to know if the desired error was, in fact, physically created on the disk.

In the same vein, a set of programs that automatically issue command sequences that might adequately test a RAID 0 system, could be nearly worthless for a RAID 4 or RAID 5 system, since the types of error patterns and availability goals each level is designed to handle are so different.

For example, to test a RAID-5 system's ability to handle defects on the media, by corrupting a chunk of a stripe, you need to know where the array management software will place the stripe patterns on the drives, so you will know which chunk of which stripe to corrupt. Trying to do this manually would be prohibitively time-consuming, and even writing a program to do this for RAID-5 would not be useful for RAID-1. In a RAID-1 system data is not striped.

A parity test for RAID-5 would be to present it with a corrupt parity block from the disk and see if it recovers the data. However, test systems that run on the host computer that the RAID system is attached to, normally can't corrupt the parity block, since parity is not visible to the host.

Since a primary function of all RAID systems is to provide some level of redundancy or reliability for the data, RAID array management that is defective can be costly for a manufacturer and its customers. Single disk systems can only store a few gigabytes of data. Very large RAID systems may cost hundreds of thousands of dollars and store hundreds of gigabytes of data. Other RAID systems may be used in client/server networks and a failure may mean costly outages for all personnel and work on the network affected by it.

Testing that can detect defects in RAID array management and permit them to be corrected before the product is shipped can be both useful and valuable. If such testing could be reproduced reliably, it could help in regression testing of the same array management function when new versions or upgrades are developed.

It is an object of the present invention to provide a method and apparatus for testing RAID array management.

It is another object of the present invention to provide a method and apparatus for automating the testing of RAID array management software.

Still another object of the present invention is providing a method and apparatus for testing RAID array management that can be done in a repeatable manner so that regression tests can be performed.

Yet another object of the present invention is providing a method and apparatus for testing RAID array management that can be readily adapted to include tests for new features or new combinations of tests or test situations.

SUMMARY OF THE INVENTION

These and other objects of the invention are achieved by an error injection scripting system that permits a test engineer to select from a series of commands those that will induce a desired test scenario. These commands are presented to a parser, either in command line form or as a batch of commands, which parses the syntax of the commands and associated parameters, to create a task list which is communicated to a scheduler. The scheduler handles the execution of the tasks in the list, converts parameters to explicit logical block test sequences and maintains test results. Tasks such as error injection use a special protocol (which the unit under test must be able to understand and interpret) to circumvent standard bus and controller protocols, so that test data, such as corrupt parity or multiple hard error failures can be sent to the disks in the RAID system, while bypassing the RAID array management functions that would otherwise automatically correct or prevent the errors. The scenario of injected errors to be tested is then executed through a tester, the results are evaluated and posted back to the scheduler.

It is a feature of the present invention that it can be used to create scenarios for the more commonly used types of RAID systems, RAID 0, 1, and 5, as well as RAID 4.

It is another feature of the present invention that it can be used to create a large number of different error and other scenarios, including the injection of hard and soft errors, to provide comprehensive and varied sets of tests.

It is an aspect of the present invention that it also permits the RAID system to be returned to a test-error-free state, so that none of the errors introduced for test purposes are left on the system after tests are concluded.

Yet another aspect of the present invention is that it permits design engineers to verify new RAID designs in the design verification stages.

Still another aspect of the present invention is that it can be used at final manufacturing test, if desired, or it can be used to recreate problems identified in the field, by creating scenarios that match those at the problem site.

It is a feature of the invention that it allows testing to be automated, which, in turn permits the analysis of the test results to be automated as well.

Still another aspect of the present invention is that testing can be done with fully functional hardware, so that known defective disks are not needed to simulate catastrophic device failures.

And yet another aspect of the present invention is that it allows a test engineer to design test scenarios using logical references to chunks and stripes, not physical addresses, so that the test design process is simplified.

DETAILED DESCRIPTION OF THE INVENTION

Figure 1:
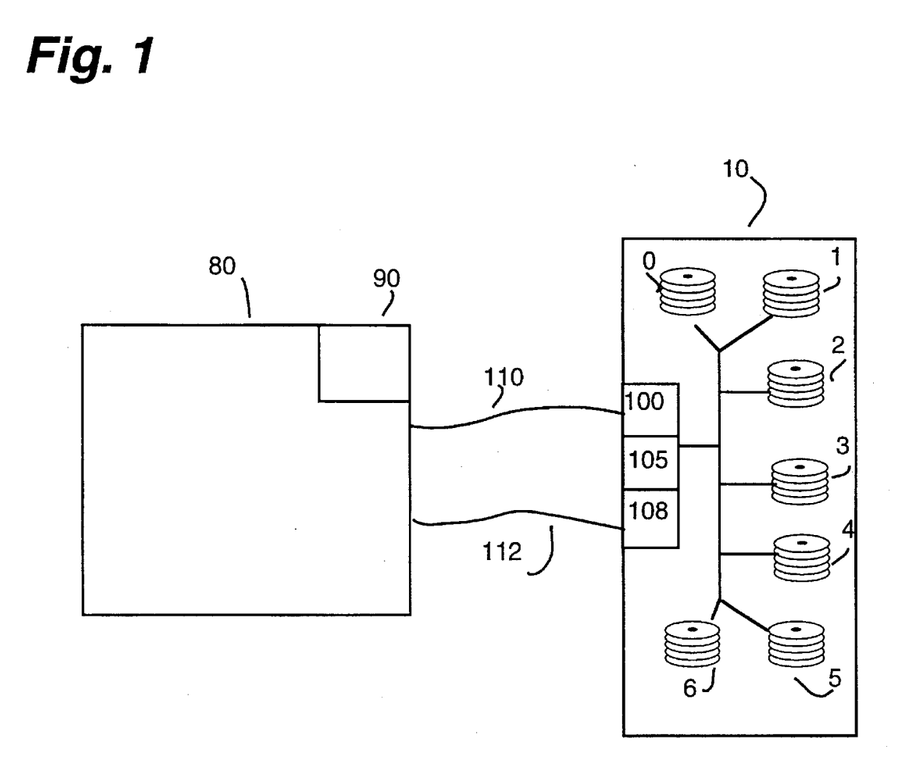
FIG. 1 is a schematic diagram of the present invention.

In FIG. 1 a test system according to the method and apparatus of the present invention is shown. Host 80, in a preferred embodiment is a personal computer capable of including an adapter board, 90, such as the Adaptec SDS-3F Board, and includes a test library for SCSI systems. In a preferred embodiment, the invention is implemented on a personal computer and uses the SCSI library. Also in a preferred embodiment, bus 110 is a SCSI (Small Computer Systems Interface) bus, but as will be apparent to those skilled in the art, other buses, such as IDE, IPI or any of a number of other buses using other protocols could be used, if desired. Similarly, host 80 can be any of a number of other types of devices, such as a minicomputer, a mainframe, or any device capable of communicating with a disk subsystem. Serial Interface 112, in a preferred embodiment, is an RS232 serial interface between the host 80 and a console monitor interface 108 of disk subsystem 10.

Still in FIG. 1, disk subsystem 10 includes a controller, 100 and a number of drives 0–6. As will be apparent to those skilled in the art, RAID subsystems that are managed by a host running array management software may be configured differently. As will also be apparent to those skilled in the art, a variety of configurations of RAID systems and disks can be tested according to the method and apparatus of the present invention. Thus, systems with as few as 1 or 2 disks could be tested, and in a preferred embodiment, systems with 9 drives are tested (8 active drives and one spare). The present invention will work with configurations containing more than 9 drives, as well.

Figure 2:
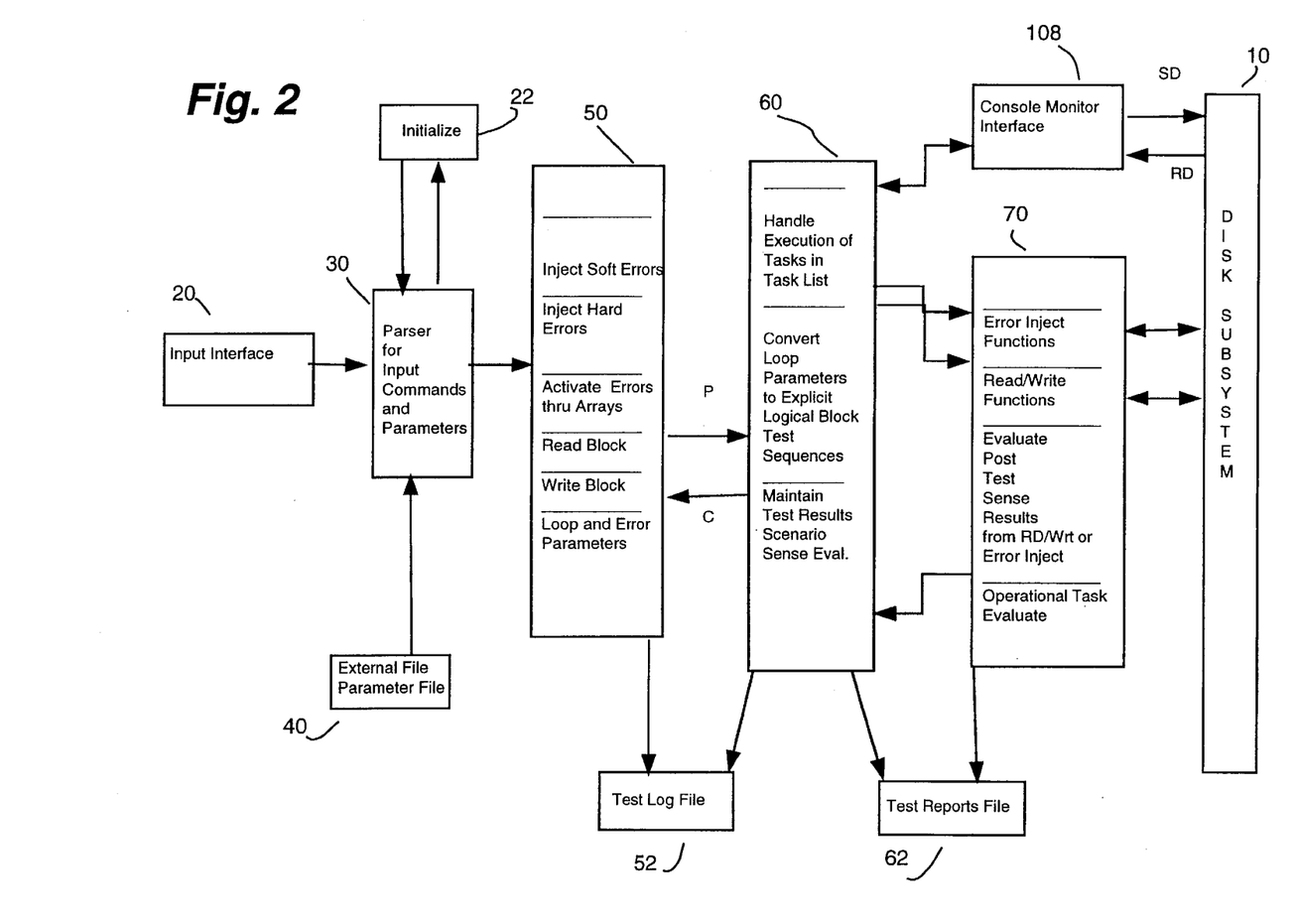
FIG. 2 is a block diagram of the major functions of the present invention.

In FIG. 2 the major elements of the present invention are depicted in an overview. Disk subsystem 10 is the RAID disk array subsystem to be tested. Commands are entered in command line format at input interface 20, or taken in batch format from external file 40. The general format of each interface command line argument in a preferred embodiment consists of the following eight main fields:

COMMAND

STRIPE SELECTOR ADDRESS

ERROR INJECTION SPECIFICATION

CONTROL

REPORTS

TEST NO

DATA

CACHE

A model number field is also included in a preferred embodiment.

In a preferred embodiment the syntax for the fields specified above is defined as follows: All fields (excepting the Command field) are enclosed by a pair of brackets. Bracket symbols were chosen as field delimiters as other fields may contain more than 1 argument. Argument values in fields are separated within the field by commas. The values within the field are always preceded by the respective identifier keyword and a colon (except for the REPORTS field). If the identifier keyword~ (and/or the colon) is missing but the value still appears, the argument scanning software will report this as a syntax error and the program will terminate. Any options not coded within its respective field is assumed to be unselected. Where appropriate, any unselected option will cause the program to use internal defaults if they exist. As will be apparent to those skilled in the art, various other types of syntax or command argument formats could be used, including, but not limited to graphical interface icons, menu-driven command structures and so on.

The commands, which include specific tests to be run as well as test supervisory commands are sent to parser 30, which converts the commands and associated parameters into a list of operations to be performed, shown as task list 50. Scheduler 60 decodes the information in task list 50, loads argument parameter structures, and then calls tester 70 to perform actual bus transfer tasks. Tester 70 is used to inject four main types of errors, according to the parameters selected by the user's command input and to issue read and write commands to disk subsystem 10.

In a preferred embodiment, the four basic error types are:

1. Longitutidinal Redundancy Check (LRC) errors. These are created either by corrupting the first byte of the calculated LRC word in a referenced block, or by corrupting the first data byte in the referenced block and rewriting it without rewriting the LRC for the block. LRC checking is unique to the AS/400 protocol. Systems that do not use that protocol may not have LRC checking.

2. Hardware failure. This is simulated by a command to power down the referenced drive. The drive can be "fixed" by use of another command (FXH) which powers on and spins the "failed" drive back up again for running.

3. Non-correctable (media). This can be created either by corrupting the Error Correcting Code (ECC) in a referenced block with a non-correctable error or by corrupting data in a referenced block with a non-correctable error. As used here, the terms correctable and non-correctable refer to the type of errors injected that the drive being tested will normally correct (hence correctable) and the type of error injected that the drive under test is unable to correct (hence non-correctable.)

4. Correctable (media). These are created by corrupting either the data or the ECC in a referenced block with a correctable error.

Figure 3:
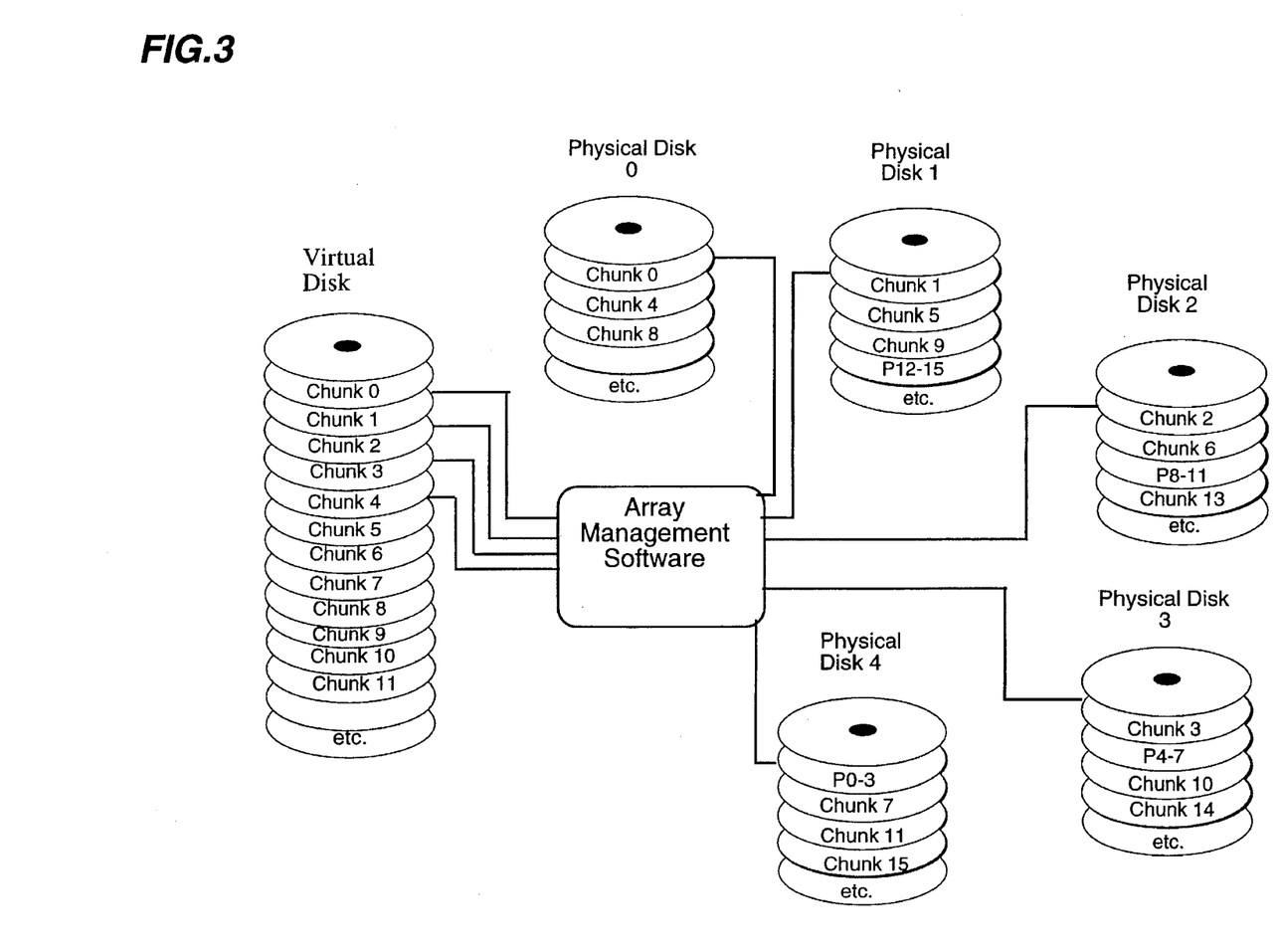
FIG. 3 is an illustrative example of chunks in a RAID-5 system.

Turning now to FIG. 3, a schematic view of a part of a RAID 5 disk subsystem 10 is shown, having 5 drives, Physical Disk 0 through Physical Disk 4. In RAID 5, data is striped across several physical disks, and parity is computed as described above to provide redundancy. In this view, a stripe would consist of 4 data chunks and one parity chunk striped over 5 of the disks in disk subsystem 10. As shown in FIG. 3, Chunks 0–3 are placed, respectively, on Physical Disks 0–3. Parity for this stripe is computed as described above and placed on a fifth physical disk, here shown as Physical Disk 4. As mentioned above, in RAID 5 systems, parity is computed by exclusive or'ing all the data chunks and then writing out the results in the parity chunk.

Figure 4:
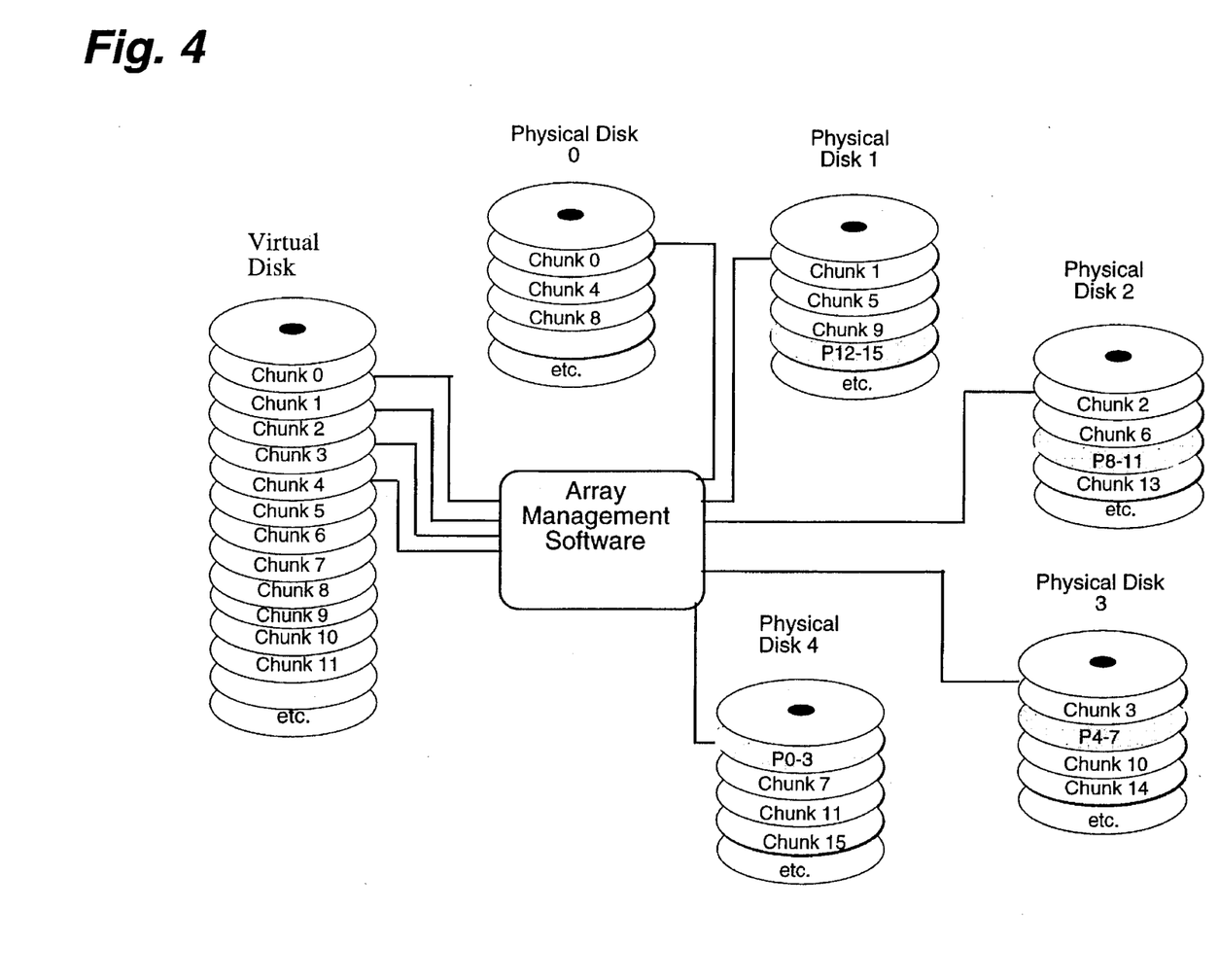
FIG. 4 is an illustrative example of a single error injected into a RAID-5 system.

A single error is depicted schematically in FIG. 4, at Physical Disk 2 where Chunk 6 of a next stripe has been removed. For purposes of illustration only, this is depicted by a chevron pattern around the word Chunk 6 in the slot where Chunk 6 used to be. The contents of the missing chunk of this stripe can be reconstructed by computing $$x = P(4-7) \oplus \text{Chunk 4} \oplus \text{Chunk 5} \oplus \text{Chunk 7}$$

and removing the effects of the other chunks from the parity comparison and leaving x=Chunk 6.

In order to test this feature of a RAID-5 system, the present invention bypasses the standard SCSI protocol, (as is discussed below) in order to write a corrupted Chunk 6 on Physical Disk 2. The RAID-5 array management software controlling disk subsystem 10 should detect the corrupted Chunk 6 on Physical Disk 2, when a subsequent read or write command is issued for Chunk 6, using normal SCSI protocol. RAID-5 array management software should perform the correct exclusive or functions on the remaining or companion chunks (Chunks 4,5 and 7 and P(4–7) on the other drives, and reconstruct Chunk 6.

In typical RAID-5 implementations, a bad chunk is reconstructed when that chunk is to be read or written, and the actual data for the chunk is written back to Physical Disk 2. However, if the chunk is missing because the disk has failed, in RAID-5 the chunk is reconstructed on each read and write, but not written back out to the disk, since that disk is no longer present to the system. The subsystem is said to be operating in a degraded mode when a disk fails. Reliability is reduced, but can be restored by what is called a rebuild, in which the failed disk is replaced by a functional one and the contents of the failed drive (Physical Disk 2 in FIG. 4) are made consistent with the remaining disks in the array, by reading the chunks from the remaining disks, computing new parity by exclusive or'ing, and writing the results to the replacement disk. A rebuild of a failed disk's entire contents can take hours, so the RAID-5 system is expected to continue operating, if possible, while it occurs. Scenarios that verify this functionality can also be created in a preferred embodiment of the present invention.

If the RAID-5 array management software is being tested for the double failure situation, the user of the present invention could make the above error of Chunk 6 on Physical Disk 2 a non-correctable media error and also simulate a hard failure of another drive by powering it down.

Figure 5:
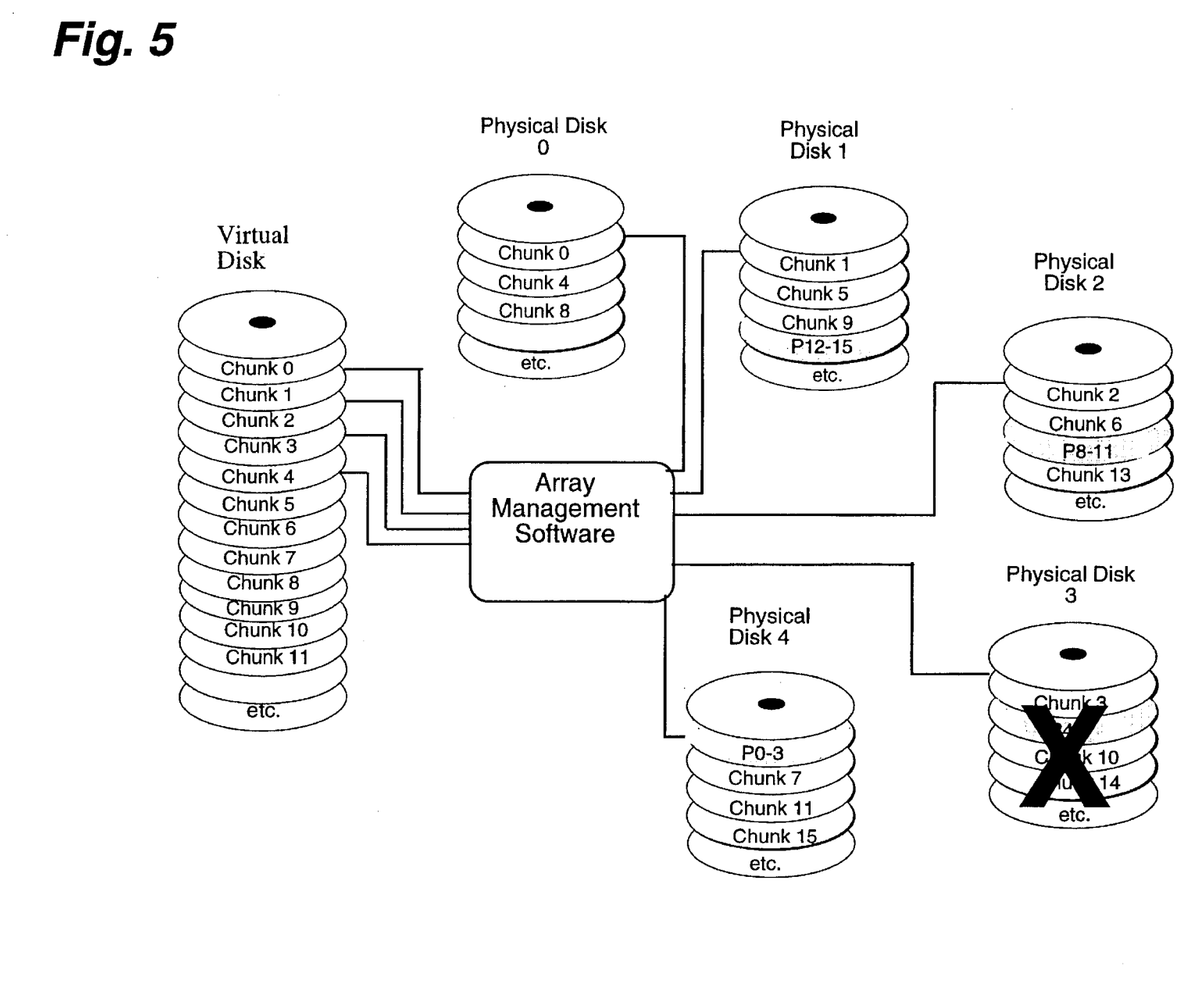
FIG. 5 is an illustrative example of a double error injected into a RAID-5 system.

In FIG. 5, both errors are illustrated. Physical Disk 3 has been temporarily deactivated by being powered down, (as indicated by a large X) using the tester and the console monitor interface 70, and a non-correctable error has been created at the location of Chunk 6 on Physical Disk 2. In this test situation, two of the chunks of one stripe are not available, so a RAID-5 system will not be able to recreate the contents of the missing chunks. The array management software being tested should detect this situation and report it. As will be apparent to those skilled in the art, a variety of other combinations of error scenarios can be created to cause double errors.

To improve performance of a disk subsystem, many manufacturers of RAID-5 systems incorporate caches. In FIG. 1, a cache 105 is shown with disk subsystem 10's controller 100. Caches can also be used by host resident array management software.

In a preferred embodiment of the present invention, several commands can be issued to manage the cache and its contents, so that a precise testing scenario can be created. For example, an invalidate cache command (IVC) can be issued to clear the cache of unwanted or unknown data, so that a fresh, defined test scenario can be started. A cache command can be issued to flush a pending write to the subsystem. In a preferred embodiment, these command are often used throughout a test scenario to guarantee data gets to the disk.

In a preferred embodiment a Cache Specification field provides command line options exclusively for supporting disk array cache tests. These commands are as follows: Look-a-head (LKHD), Back End Write Pause Request (BKWR), and Invalidate Cache (IVC). Execution of all three commands is facilitated by the Console Monitor Interface shown in FIG. 1, and FIG. 2 via the Send and Receive Diagnostic commands. In a preferred embodiment, the commands perform as follows:

The Look-a-Head (LKHD) command requires a single subfield argument in the form of either the letter "E" (for Enable) or "D" (for Disable). This command either enables or disables the look a head functions in the cache.

The Back End Write Pause Request' (BKWR) option has a subfield argument consisting of one of the following letters; the letter "P" which requests a PAUSE in writing data out (from the back end) to the drives, or the letter "R" which directs the cache to RESUME its normal "back end" writing operations (transferring data from cache to the targeted disks). This option provides a control "handshake" which allows the test engineer to more accurately determine when data is actually transferred from the write cache to the respective targeted drives. This feature enables the Test Engineer to design test scenarios that enable checking the proper operation of the cache when; a) the Host reads non-volatile (NV) Ram while data is being written out to disk, b) cache write to disk starts while the Host is reading, c) double cache writes occur while data is being written out to disk from cache. The facilities provided by this option can also be used to verify that the NV section of cache contains the most recent generation of any block written out to disk from cache.

The IVC option simply invokes the Console Monitor Interface's InValidate Cache command. This command effectively flushes the write cache to disk, and clears out the read cache. In a preferred embodiment, a test engineer is responsible for designing scenarios where the IVC command will play an important role and data patterns will be used extensively as part of the test. When a preferred embodiment of the present invention executes the IVC command, it will always be done at the beginning of the script execution sequence. So if the Test Engineer uses the IVC option in a script that also specifies a write command, the IVC will not remove the data used by the write command from the cache, but it will remove all data written prior to the execution of this line of test script. In preferred embodiments, a RSB (Restore data from the Save buffer) command is coded on a separate line of script with no other commands except the IVC command. This will have the effect at the end of a given test of clearing all extraneous data out of the cache, while restoring the data in all blocks in the plane to the original pretest data.

In a preferred embodiment, a single stripe is also referred to as a stripe plane, and generally represents the location where at any one instance testing is in progress.

In a preferred embodiment of the present invention the primary way in which the user specifies where an error injection or other action is to occur is by specifying a stripe selector address. The stripe selector address field contains the device designator keyword, as TID: and LUN: along with the associated LBA # for one specific block in the stripe. The format for the Stripe Selector Address field is illustrated in the following sample text:

TID:#,LUN:#,LBA:#

For a particular action the user designates one of the blocks of a stripe by specifying its target identity (TID), a logical unit address (LUN) for it and a logical block address (lba).

The present invention also uses a report stripe function to identify all the companion blocks on other disks that make up the stripe. In a preferred embodiment, this report stripe function uses the same algorithms used by the array management software under test to compute where a particular stripe and the chunks within it are located. Since the algorithms used vary by manufacturer and sometimes even by model number, they are not included here but will be known to those skilled in the art who are working with a given manufacturer's array management software or firmware.

Figure 6:
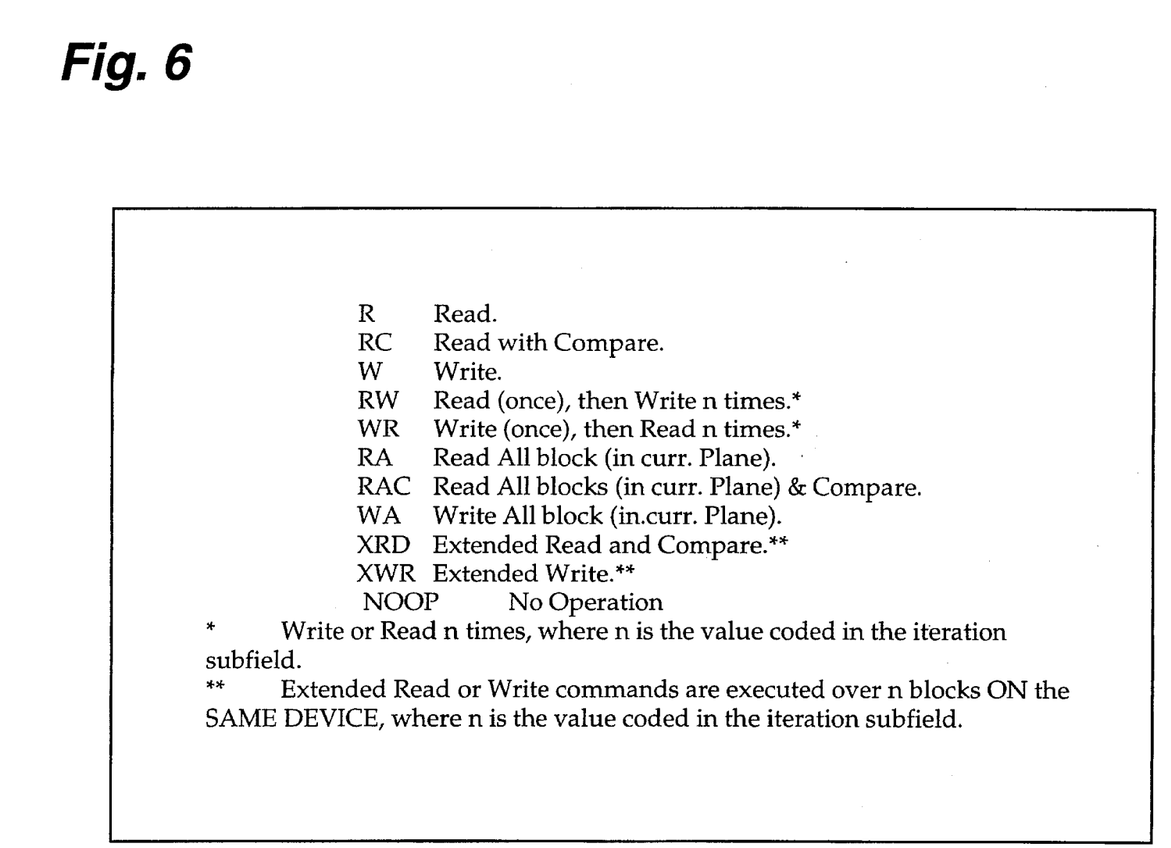
FIG. 6 is a table of typical commands that can be executed in a disk system.

Executable device commands that are to be performed at that stripe selector address are specified. In a preferred embodiment, these include the commands listed in FIG. 6, such as Read, Read with Compare and so on. As will be apparent to those skilled in the art, if devices with different commands are to be tested, the different commands can be substituted.

Figure 7:
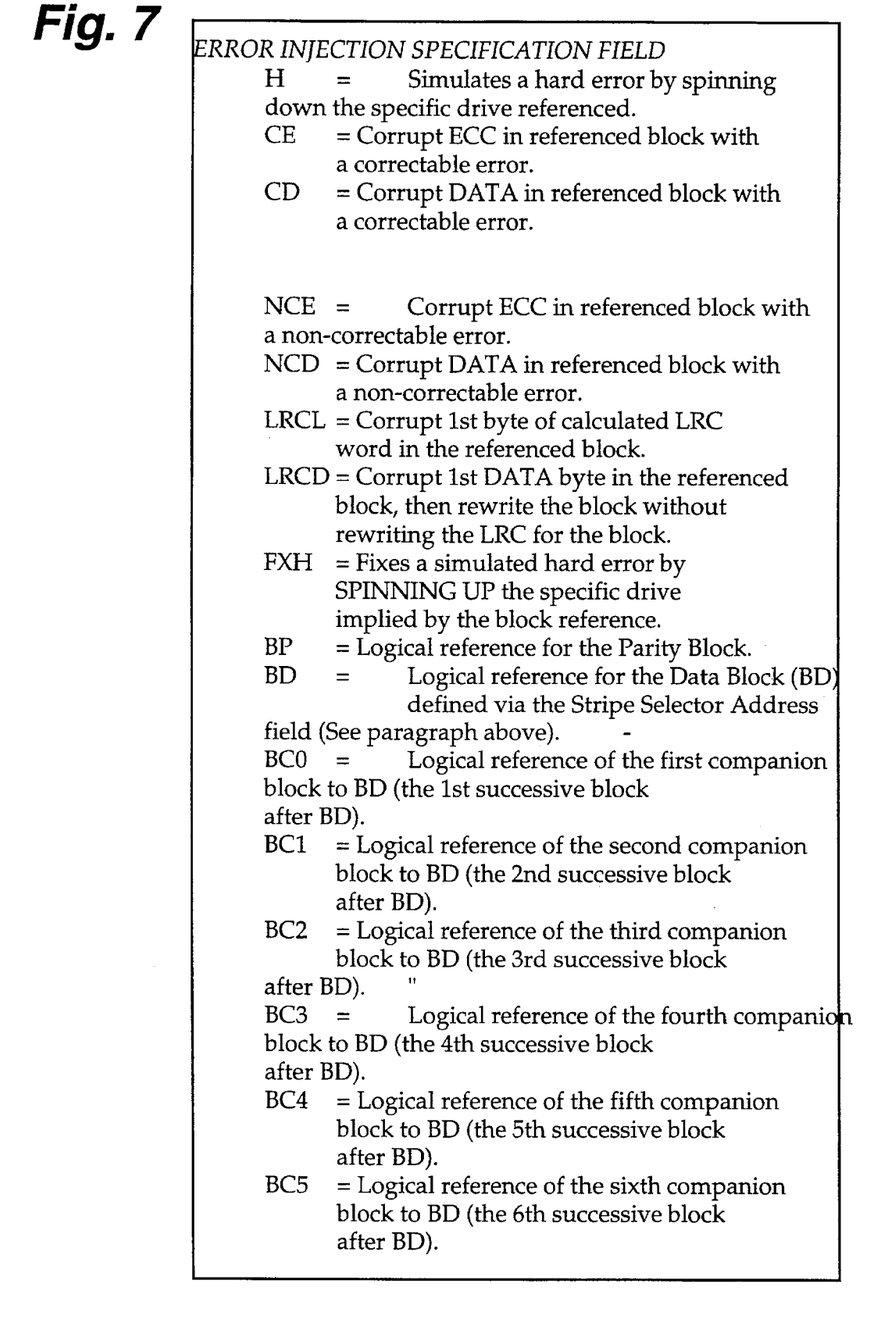
FIG. 7 is a table indicating the types of errors that can be injected according to the method and apparatus of the present invention.

FIG. 7 shows the various ways in which the errors to be injected can be specified in preferred embodiment of the present invention. In the syntax of a preferred embodiment, these parameters are used to define the type of error(s) to be injected at designated locations. For example, the parameter CE is used in a preferred embodiment to specify corrupting the ECC in the reference block with a correctable error. The number of arguments used in the Error Injection Field is optional, with the only limitation in a preferred embodiment being that any given keyword can only appear once within this field for any input string, or the field can be left empty. Also in a preferred embodiment, there are no defaults for Error Injection, so if this field is left empty, the net result of inputting a command string with an empty Error Injection Field is to execute the specified command without any errors injected.

Still in FIG. 7, it can be seen that a preferred embodiment provides a logical nomenclature a test engineer may use to refer to a specific chunk or block and its nearby blocks and parity block. BD is used as the logical reference for the data block being subjected to a test. BP is the reference to that data block's parity block. BC0 is a logical name given to the first companion block, the first successive block appearing after data block BD, and BC1–5 are used in this example to refer to the next five companion or successive blocks after BD.

Figure 8:
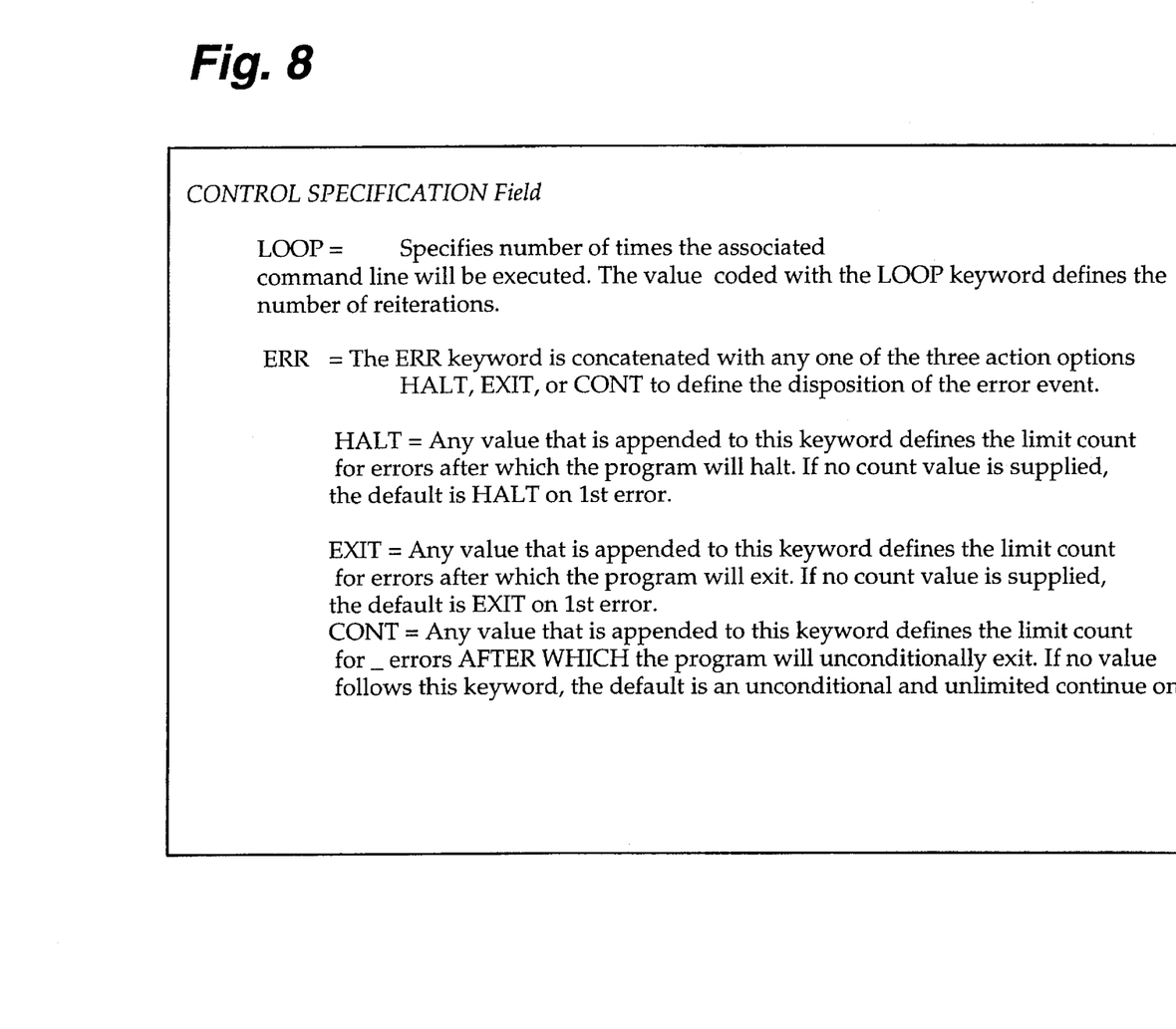
FIG. 8 is a table indicating the contents of a command control field of the present invention.

Turning now to FIG. 8, sample controls of the present invention are shown. When a command line is created by a test engineer, a Control Specification Field is used to define which control applies. The Control field can contain different types of arguments, namely one for the LOOP count, and a second one for error (ERR) which specifies how to handle errors. In a preferred embodiment, all the arguments comprising the Control field are optional, even to the point that the entire field can be left blank (or unused). If no Control arguments appear in the input string, the only default that will be used for this field will be an unconditional EXIT on the first error to occur during testing, and a LOOP value of 1 (meaning no looping).

Returning briefly to FIG. 2, a method of bypassing conventional SCSI protocol in order to permit testing according to the method and apparatus of the present invention is shown. In FIG. 2, diagnostic commands (SD and RD) are used to communicate directly with the unit under test-disk subsystem 10. These commands permit such operations as powering a disk up and down. In order to create a corrupt parity test, diagnostic commands, coupled with a read/write long with a vendor unique reserved byte in SCSI systems allow the tester to read and write the parity portions of blocks of data on a drive. This is also used for accessing data blocks by skipping over the standard unit software.

Still in FIG. 2, the SCSI libraries used in a preferred embodiment have read and write test libraries that were designed for disk systems that do not use RAID. These libraries contain standard SCSI protocol command tests. The present invention allows a manufacturer of a RAID system to take advantage of pre-existing libraries, such as the ADAPTEC libraries, and test tools such as the and still incorporate testing that is unique to the particular RAID level. The specifications of the relevant portions of the Adaptec Board used in a preferred embodiment of the present invention are attached hereto as Appendix A and hereby incorporated by reference.

Figure 9:
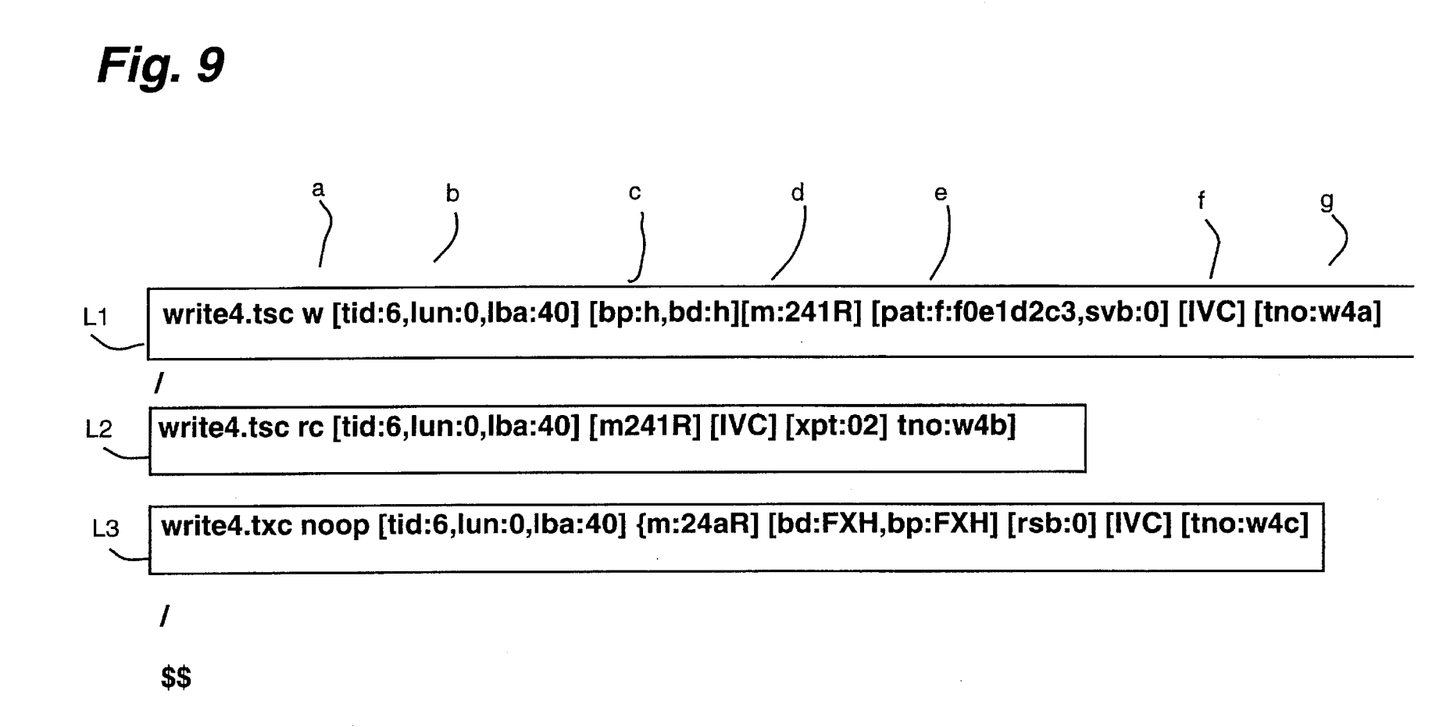
FIG. 9 is a sample test scenario command line sequence according to the method and apparatus of the present invention.

Turning now to FIG. 9, an example of a series of command lines that form a test scenario are shown. Here two errors are injected: a bad block is created and a parity drive failure is to be simulated. At L1, a write command is issued, as shown at L1 a by the letter w, which is interpreted in the present invention to mean write a data block, (BD). Next, the stripe selector (b) parameters that identify the unique block(s) to be affected are shown. First, the target id (TID) number and a logical unit number (LUN) are given, which identify the drive being referenced. Then a logical block address (lba) identifies the block and the stripe that contains that block which is being selected.

Still in FIG. 9, at L1, next the error injection specification field, c (the parameters of which are shown in FIG. 7) allows the user to specify what types of errors are to be injected into which blocks. As mentioned earlier, in a preferred embodiment, blocks within the selected block are given specific "names." Thus, BP represents the parity block, BD the target data block, and BC0–n, the companion data blocks, each numbered in the order in which they succeed BD. Thus, BC0 is the first successive companion block that follows BD. BC1 is the next, and so on. In this command, h is used to indicate that hard failures of target data block (BD) and its associated parity block (BP) are to be injected. The next field is an optional model number identification field d, which is used in a preferred embodiment to indicate which model is being tested.

Still in FIG. 9, L1, the next field is the data field e. This has three subfields which are the pattern (pat) specification field, the save (SV) field, and the restore (RS) field. (The restore field is shown at L3 of FIG. 9.) The pattern subfield allows the user to specify a particular pattern that is to be used for writing and reading. If one is not specified, the system provides a default pattern. The save and restore fields are used in a preferred embodiment to allow the user to return the unit under test to its pre-test state. In this example, the block to be corrupted is saved in a save buffer before the pattern is written. The restore field is used at line three, after the test, to return the block to the initial status which was saved at line 1.

Data field e is used to enter test pattern data into the system. Data field e also provides facilities for the command to "save" and "restore" data from all of the blocks in the current plane. This provides a means of cleaning up errors injected into blocks during testing. In a preferred embodiment, each test pattern coded into this field requires, in addition to the actual pattern itself, a definition as to the type of pattern that has been input. These definition characters are in the form of single character "declarators" which identify the pattern as either Fixed, Incrementing, or as a Random Data Seed. Also in a preferred embodiment, any pattern that is input remains the active pattern until it is replaced by another pattern in another line of script.

In a preferred embodiment, the data pattern is specified as follows:

[PAT:F]=Selects default fixed data pattern.

[PAT:F:hhhhhhhh] where each h is a hex ascii digit.

[PAT:I:hhhhhhhh] where each h is a hex ascii digit, and increment the input pattern.

[PAT:R:hhhhhhhh] selects random data, where each h is a hex ascii digit of the input seed for the random sequence.

In a preferred embodiment the invention will use whatever data pattern is specified for both writing and reading during the execution of the script line. The pattern type is declared by the modifier letter immediately following the pattern keyword. As shown above, the modifier is one of three alphabetic characters, namely f, i, or r. The character 'f' declares the accompanying pattern to be "fixed". The character 'i' declares the accompanying pattern to be "incrementing". The character 'r' declares the associated pattern to be used as a "seed" for a random data generation sequence.

The save (sv) subfield contains one mandatory argument, in a preferred embodiment, in the form of a number from 0 to 9. In this embodiment, the invention provides a total of 10 save buffers, each of which is capable of storing one plane of data. Hence the numerical argument coded with the sv command will select one of the ten buffers and the current contents of all blocks in the plane will be stored in the selected buffer. For example, sv:3 will copy the contents of the current plane (selected by the stripe selector b) into save/restore buffer #3. Likewise the restore (rs) subfield when coded in the data field e will restore or write the data currently stored in the save/restore buffer referenced in the command. For example, rs:3 will copy the contents of buffer #3 back into the corresponding blocks of the currently selected plane. The save and restore commands are provided in a preferred embodiment primarily to support total cleanup of the currently selected plane that has had errors injected into its blocks.

An additional option, the validate parity (vp), is also included as a subfield in the data field e. The vp command is actually invoked via the console monitor interface and the send/receive SCSI diagnostic command. When the vp command is coded in data field e it will validate the parity on the current plane. It is noted that the console monitor interface also allows this command to be issued from a terminal connected to monitor. Access via a console monitor provides a greater range of parity checking options, and in a preferred embodiment this facility can be used for other parity checking operations, such as validating parity for the entire disk array. The vp command's use is primarily to validate that the contents of parity are correct after various error injection and test scenarios have been completed on a specified plane under test.

Again in L1 of FIG. 3, cache field f contains an invalidate cache command, which insures that the pattern to be written in this test is not overwritten later by any pending write in the cache. Finally, testnumber field g of line 1 allows the user to insert a test number for each command line of a test. In a preferred embodiment, this is used to identify a line of test script by printing it as a header in the test log. In turn, it can be used in printed reports to verify test sequences.

Still in FIG. 9, at L2 the user has specified that a read with compare (rc) should be executed for the block being tested. Note that an invalidate cache command (IVC) is issued here as well. And now at L3 of FIG. 9, a noop command is issued. When no read or write operation is required to either inject errors or restore the block to its original state, a noop command is used, as shown here. At L3, in this example, the system is restored to whatever state it was in before errors were injected. This is accomplished by using the FXH operand for the BD and BP fields, as well as the restore command. In a preferred embodiment, referring briefly again to FIG. 7, it can be seen that FXH means the system should fix a simulated hard error by spinning up the specific drive. In the example in FIG. 9, the drives that were powered down by the commands of L1, are now turned on again, and the blocks that were saved at L1 are restored. As a result, the disk subsystem being tested has been returned to its original state-free of any errors injected by the test process.

Those skilled in the art will appreciate that the embodiments described above are illustrative only, and that other systems in the spirit of the teachings herein fall within the scope of the invention.

What is claimed is:

1. An apparatus for injecting errors into a RAID disk subsystem for test purposes, comprising:

a host connected to said RAID disk subsystem, said host having a device for communicating test scenarios that inject errors into said RAID disk subsystem;

logical referents for use in said test scenarios, for specifying placement of errors and types of errors to be caused in said RAID disk subsystem;

a test script system coupled with said host for parsing said logical referents into physical addresses and commands in tasks and then scheduling said tasks and conveying them to a tester for execution with said RAID disk subsystem, so that errors may be injected into said RAID disk subsystem without first being corrected by said RAID disk subsystem's normal processes.

2. The apparatus of claim 1, wherein said test script system further includes buffers for saving the contents of said RAID disk subsystem before tests are executed and from which said contents can be restored after tests are executed, so that said RAID disk subsystem can be returned to its pre-test state.

3. The apparatus of claim 2, wherein said host includes a pre-existing library of disk test commands for disks in said RAID disk subsystem.

4. The apparatus of claim 2 wherein said RAID disk subsystem further includes an interface capable of sending and receiving commands that bypass said RAID disk subsystem's normal protocol, to create certain types of errors.

5. The apparatus of claim 4 wherein said test script system includes:

a parser for analyzing logical referents in command, address selector, and data fields to create sequences for testing; and a report stripe function which uses said RAID disk subsystem's stripe placement algorithms to provide physical disk locations and block addresses to said test script system, so that said logical referents can be translated into physical disks and track addresses.

6. The apparatus of claim 5 wherein said test script system includes a scheduler for scheduling tasks to be performed.

7. The apparatus of claim 6 wherein said test script system includes a tester for communicating directly with said RAID disk subsystem to carry out said test tasks.

8. The apparatus of claim 7, wherein said test script system includes a report function that analyzes test results and creates a report.

9. A method for injecting errors into a RAID disk subsystem for test purposes, comprising the steps of:

connecting a host to said RAID disk subsystem, said host having a device for communicating test scenarios that inject errors into said RAID disk subsystem;

defining logical referents for use in said test scenarios, for specifying placement of errors and types of errors to be caused in said RAID disk subsystem;

coupling a test script system with said host for parsing said logical referents into physical addresses and commands in tasks and then scheduling said tasks and conveying them to a tester for execution with said RAID disk subsystem, so that errors may be injected into said RAID disk subsystem without first being corrected by said RAID disk subsystem's normal processes.

10. The method of claim 9 wherein said step of coupling a test script system to said host further includes the step of saving the contents of said RAID disk subsystem before tests are executed into buffers from which said contents can be restored after tests are executed, so that said RAID disk subsystem can be returned to its pre-test state.

11. The method of claim 10, further comprising the step of including a pre-existing library of disk test commands for disks in said RAID disk subsystem.

12. The method of claim 10 further comprising the step of sending and receiving commands that bypass said RAID disk subsystem's normal protocol, to create certain types of errors.

13. The method of claim 12 further comprising the steps of:

analyzing logical referents in command, address selector, and data fields to create sequences for testing; and using said RAID disk subsystem's stripe placement algorithms to provide physical disk locations and block addresses to said test script system, so that said logical referents can be translated into physical disks and track addresses.

14. The method of claim 13 further comprising the step of scheduling tasks to be performed.

15. The method of claim 14 further comprising the step of communicating directly with said RAID disk subsystem to carry out said tasks.

16. The method of claim 15, further comprising the steps of analyzing test results; and creating a report.

* * * * *